United States Patent [19]

Bucha et al.

[11] Patent Number: 4,511,264
[45] Date of Patent: Apr. 16, 1985

[54] GAS TEMPERATURE MONITORING DEVICE

[75] Inventors: Robert M. Bucha, Glenshaw; Albert J. Dzermejko, Jeanette; James G. Stuart, Pittsburgh, all of Pa.

[73] Assignee: Raymond Kaiser Engineers Inc., Oakland, Calif.

[21] Appl. No.: 483,552

[22] Filed: Apr. 11, 1983

[51] Int. Cl.³ .............................................. G01K 1/16
[52] U.S. Cl. ..................................... 374/135; 374/121
[58] Field of Search ............... 374/116, 121, 132, 135, 374/136, 137, 139, 140, 158, 163, 166; 73/863.11, 863.85, 864.74, 863.31; 374/141, 181; 164/142, 143

[56] References Cited

U.S. PATENT DOCUMENTS

| | | | |
|---|---|---|---|
| 665,912 | 1/1901 | Jolicard | 165/142 |
| 1,444,776 | 6/1915 | Northrup | 374/139 |
| 3,240,069 | 3/1966 | Kennedy . | |
| 3,250,125 | 5/1966 | Bonn | 374/140 |
| 3,542,521 | 11/1970 | Kulling et al. | 165/142 |
| 3,596,518 | 8/1971 | Kirkpatrick | 374/166 |
| 3,861,461 | 1/1975 | Kissinger | 169/142 |
| 3,888,123 | 6/1975 | Küntziger et al. . | |
| 3,910,347 | 10/1975 | Woebcke | 165/142 |
| 4,044,612 | 8/1977 | Powell . | |
| 4,072,189 | 2/1978 | Chaix et al. | 165/142 |

FOREIGN PATENT DOCUMENTS

1292359  3/1962  France ................................. 165/142

OTHER PUBLICATIONS

Latest Blast Furnace Instrumentation Techniques and Applications by Ohtsuki et al., Oct. 1976, pp. 9–18.
Chenre et al., "Experience with Above Burden Temp. Probes on Algoma's No. 7 Blast Furnace", pp. 84–97, (Publication Date Unknown).

*Primary Examiner*—Charles Frankfort
*Assistant Examiner*—David R. Schuster
*Attorney, Agent, or Firm*—Flehr, Hohbach, Test, Albritton & Herbert

[57] ABSTRACT

A probe for measuring temperatures in a hot gaseous medium such as the gases inside the shaft of a blast furnace. A first tubular member extends from a base structure such as a blast furnace wall into the gaseous medium. Successively smaller, second and third tubular members are concentrically positioned inside this exterior tubular member. Preferably, an exterior protective member also surrounds the first tubular member. A refractory material is interposed between the exterior protective member and the first tubular member to minimize temperature fluctuations in the body of the probe itself. Thermocouple leads extend longitudinally in an air space between the second and third tubular members and then protrude to the exterior of the probe. A forward fluid coolant passageway is formed inside the third tubular member. This forward passageway connects at its terminal end with a radial fluid passageway which is formed between a radial flange on the fourth tubular member and a closure plate on the first tubular member. A rearward fluid coolant passageway is also formed between the first and second tubular members. Cooling efficiency is enhanced because the fluid coolant is maintained in the cooler center of the probe until it reaches the terminal end of the probe which is typically its hottest section.

2 Claims, 3 Drawing Figures

GAS TEMPERATURE MONITORING DEVICE

BACKGROUND OF THE INVENTION

1. Field of the Invention

The present invention relates to devices for monitoring the temperature of hot gases and, in particular, to such devices which are useful in shaft furnaces such as blast furnaces.

2. Description of the Prior Art

In various industrial processes, it is necessary to monitor temperatures at one or more positions in a hot gaseous medium. In a blast furnace, for example, it is known that useful adjustments in the iron making process may be effected based upon temperature measurements which may be taken within the furnace stack. Since, however, temperatures in blast furnace stacks may range up to about 1200° F., serious maintenance problems have often been associated with probes heretofore in use for this purpose. Furthermore, it has been found that the precision or accuracy of the gas temperature measurements obtained with some probes heretofore known may be adversely affected by the tendency of such probes to thermally deform so that measurements are not always taken at the same positions. It is believed that a certain degree of imprecision or inaccuracy may also result from the tendency of such probes to be subject to substantial thermal fluctuations in their interior thermocouple lead housing sections. It is, therefore, an object of the present invention to provide a gas temperature monitoring probe which avoids the above described disadvantages which have been associated with certain probes heretofore known in the art.

SUMMARY OF THE INVENTION

The present invention comprises a probe for monitoring temperatures at one or more positions in a hot gaseous medium. A typical use for this probe would be to measure the temperature of the gases in the shaft of a blast furnace. The probe is fixed to a support such as the blast furnace wall and extends into the gaseous medium. The probe is composed of multiple concentric, tubular members which are covered on the exterior surface of the outside tubular member with a suitable refractory coating. When used in a blast furnace environment, this refractory coating should include an abrasion resistant plate covering on its upper side. A suitable, segmented heat shield may also be used to cover the underside of this refractory coating.

The multiple tubular members are composed of three concentric tubes. The first tubular member acts as the main support member and is closed at its terminal end. A smaller second tubular member is positioned inside the first tubular member. This second tubular member provides additional structural support and provides an annulus for a cooling medium between its outside surface and the inside surface of the first tubular member. A third tubular member is positioned inside the second tubular member and provides a forward passageway for water or some other fluid coolant. This third tubular member is equipped with a terminal flange which abuts the second tubular member, so that the coolant flows radially outwardly from the terminal end of the third tubular member and then flows in a reverse direction in the annulus formed between the first and second tubular members. By means of the above described configuration, the coolant will remain relatively cool until it is used to absorb heat at the terminal end of the probe which will often be its hottest part. A refractory material covers the exterior surface of the first tubular member so that the body of the probe itself will be resistant to severe fluctuations in temperature. Preferably, structural spacer blocks will also be positioned between the first and second tubular members so that the second tubular member will help reinforce the entire probe.

BRIEF DESCRIPTION OF THE DRAWINGS

The present invention is further described in the accompanying drawings in which.

DETAILED DESCRIPTION

Figure 1:
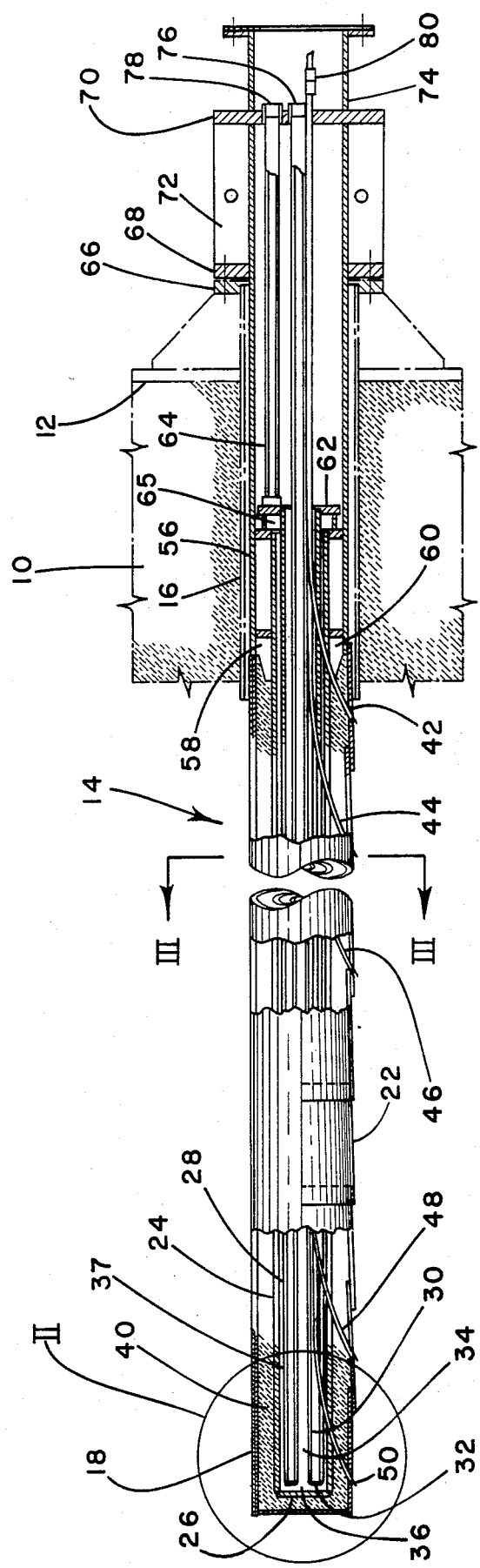
FIG. 1 is a side elevational view in partial vertical section of a probe representing a preferred embodiment of the present invention.

Referring to the drawings, a blast furnace wall is shown in fragment at numeral 10 and its conventional steel shell is shown at numeral 12. A preferred embodiment of the probe of the present invention is shown generally at numeral 14. A nozzle 16 extends through the blast furnace wall 10, and the probe is fixed to this nozzle to extend through the wall and into the shaft of the furnace. Preferably, the terminal end of the probe will be positioned at the center of the furnace shaft. While one probe may be used in monitoring above burden gas temperatures in a blast furnace, it may be preferred to use four probes, each spaced from adjacent probes on the furnace wall by ninety degrees and extending radially inwardly so that they terminate near a common point at the center of the shaft. For the purpose of describing the orientation of the probe of the present invention and its components, the term "forward" will, herein, be understood to mean the direction into the gaseous medium to be measured or in the specific case of a blast furnace, this term will mean toward the center of a blast furnace shaft and away from the direction of the wall. The term "rearward" will be understood to mean the direction away from the gaseous medium to be measured or in the specific case of a blast furnace, away from the center of the blast furnace shaft and toward the wall.

Figure 2:
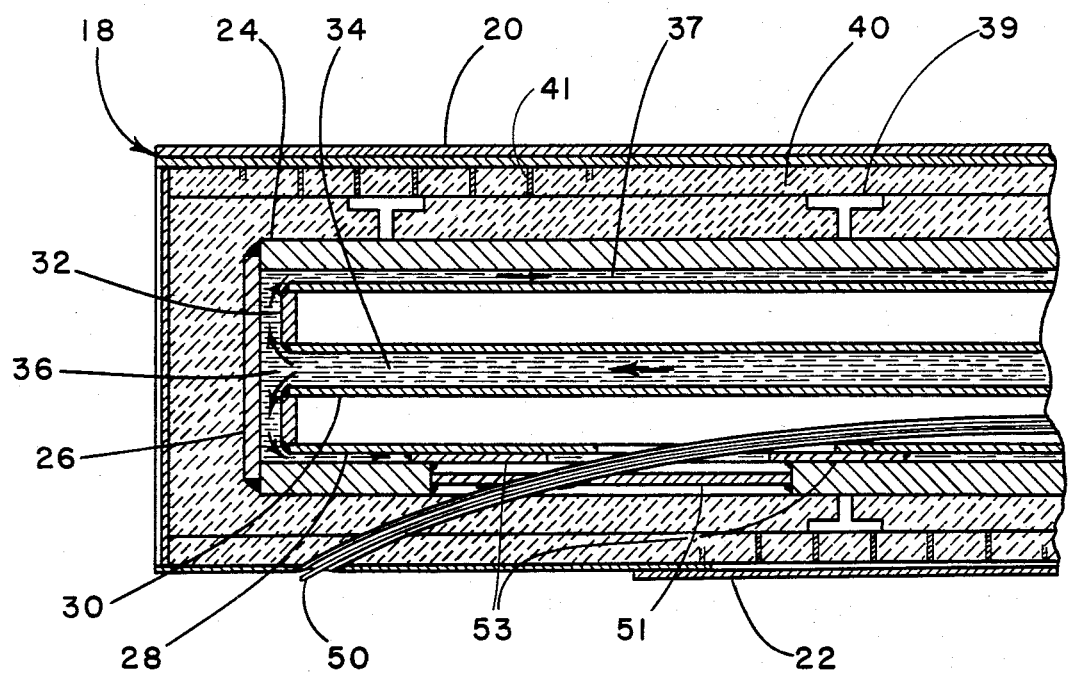
FIG. 2 is an enlarged view of the area with Circle II in FIG. 1.

The probe includes an exterior cylindrically-shaped protective member shown generally at numeral 18. This protective member includes an integral abrasion resistant plate 20 (FIGS. 2 and 3) which, in the case of blast furnace use, protects the probe from damage from falling solid material. Also included in the exterior protective member 18 is a semi-cylindrical bottom protective section 22 which is connected to the upper plate 20 and constructed of a plurality of longitudinally aligned bands, (FIG. 1) each of which overlays a small portion of the band in front of it. This arrangement allows this bottom protective section to thermally expand and contract without deforming the probe as a whole.

A first tubular member 24 is positioned inside the exterior protective member 18. It will be observed that this first tubular member is axially aligned and positioned concentrically with respect to the protective member. The first tubular member does not extend as far forward as does the protective member and at its terminal end it is equipped with a closure plate 26.

A smaller second tubular member 28 is positioned inside the first tubular member and is also axially aligned and concentrically arranged with respect to the other members in the probe. Its forward terminal end is rearwardly spaced from the closure plate 26. A third tubular member 30 extends axially within the second member 28. The forward ends of both members 28 and 30 are secured to the annular closure 32. Inside the third tubular member 30, forward is a fluid coolant forward passageway 34. Between the annular closure 32 and the closure plate 26, there is formed a terminal fluid coolant passageway 36, which connects the passage 34 provided by the third member 30 and the passage 37 between the first and second tubular members. Retained by anchors as at 38 and 39, a refractory material 40 is interposed between the exterior protective member 18 and the first tubular member 24. A metal grid shown in fragment at 41 is also cast into this refractory.

Figure 3:
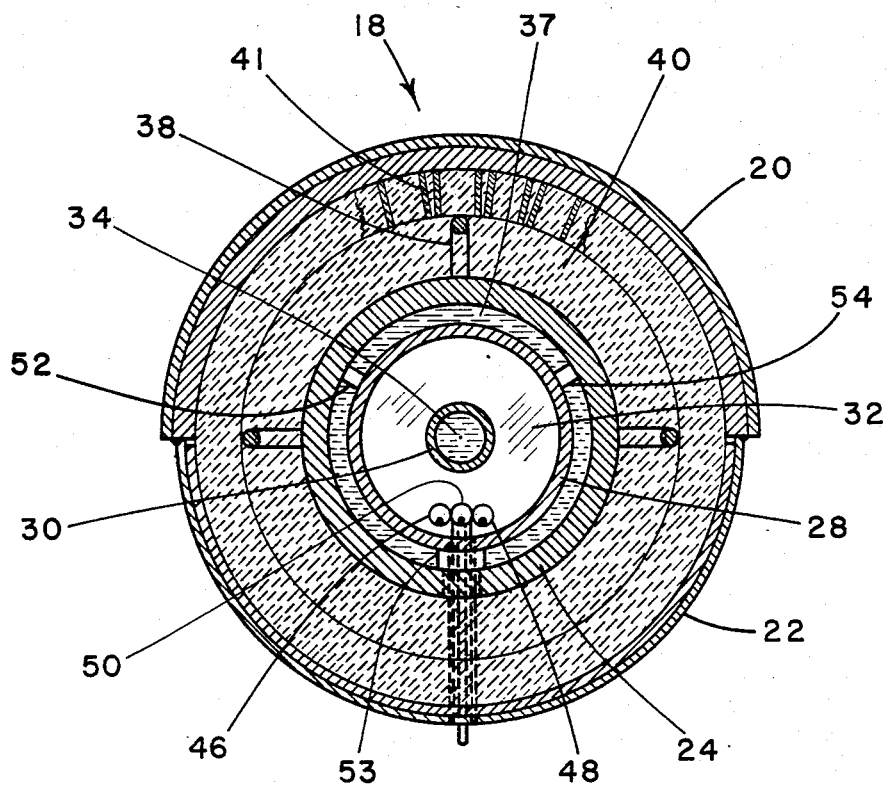
FIG. 3 is an enlarged cross sectional view of the probe of the present invention as taken through line III—III in FIG. 1.

A plurality of thermocouples and lead combinations 42, 44, 46, 48 and 50 run longitudinally in the air space between the second tubular member 28 and the third tubular member 30. At a point shortly forward of the furnace wall 10, the thermocouple and lead combination 42 extends through the space between first and second tubular members 24 and 28, then through the fluid coolant passageway 37, a seal plate 51, the first tubular member 28, the refractory material 40 and finally through the protective member 20 so that the thermocouple is exposed to the gas in the furnace shaft to monitor gas temperature at that point. As is shown, in particular in FIG. 1, each of the thermocouple and lead combinations 44, 46, 48 and 50 extend somewhat further longitudinally and to monitor gas temperatures at different positions. The radial path of thermocouple and lead combination 50 is shown in FIG. 3 in broken lines. Though not shown in broken lines, it will be understood tht thermocouple and lead combinations 46 and 48 are similarly arranged.

A series of structural spacer blocks 52, 53 and 54 are shown provided at periodic circumferential intervals between the first tubular member 24 and the second tubular member 28. These spacer blocks allow the second tubular member 28 to contribute to the structural support of the probe as a whole and tend to give the entire probe sufficient rigidity so that it will tend not to droop at its terminal end under extreme temperature conditions. It will be observed that spacer block 53 is centrally perforated to allow thermocouple and lead combination 50 to pass through it.

A rearward extension tube 56 abuts end to end to the exterior protective member 18 and is connected to the first tubular member 24 by means of gusset plates as at 58 and 60. Within the extension tube 56, there is an annular member 62 through which a fluid coolant outlet pipe 64 is connected. Pipe 64 connects with a fluid reservoir 65 formed at the rearward end of fluid coolant passageway 37 formed by the third tubular member.

An annular flange 66 is provided on the rearward end of nozzle 16, and another annular flange 68, which extends from the extension tube 56, is connected to the annular flange 68. A rearward plate 70 is fixed to the rearward end of the extension tube 56. It will seem that this plate extends radially, outwardly from the extension tube, and a plurality of longitudinal fins as at 72 which extend radially from the extension tube connnect it with annular flange 68. On the rearward side of plate 70, there is fixed a chamber 74. Apertures are also provided in plate 70 so that within this chamber there is a fluid coolant feed connection 76, a fluid coolant discharge connection 78 and thermocouple lead connections 80.

Fluid coolant is introduced by any conventional means at the fluid coolant feed convention 76 and this coolant flows toward the terminal end of the probe through the passageway 31 provided by the third tubular member 30, and from thence through passage 30 and then through the reverse passageway 37. The fluid then passes through the annular fluid reservoir 65 and the fluid coolant outlet pipe 64 to the fluid coolant discharge 78. It will be appreciated that by virtue of the above arrangement, the fluid will remain relatively cool in the interior fluid coolant passageway 34 until it reaches the terminal end of the probe where temperatures of the probe will typically be highest. It will also be appreciated that the precision or accuracy of measurements taken with this probe will be improved because the refractory limits thermal fluctuations in the probe itself, because the thermocouple leads are housed in a relatively cooler central air chamber and because an interior tubular member is employed to reinforce the probe so as to lessen the probability that the probe will bend so that measurements will not be consistently taken at the same positions.

Although the invention has been described with a certain degree of particularity, it is to be understood that the present disclosure has been made only as an example and that the scope of the invention is defined by what is hereafter claimed.

What is claimed is:

1. A gas temperature monitoring device for monitoring hot gases in a furnace, comprising:

a tubular protective member adapted to extend into a hot gaseous medium of a furnace, the member having a closure at its one forward end within the furnace, and having its other end exterior of the furnace;

a first tubular member disposed axially within the protective member having its forward end spaced from the forward end of the protective member and having closure means at its forward end;

refractory material disposed in the space between the protective member and the first tubular member;

a second tubular member disposed within and axially aligned with the first tubular member and dimensioned to provide a liquid flow passage between the first and second members;

a third tubular member extending through the second member for introducing a liquid coolant into the exterior end of the second tubular member and for conducting the coolant through the second member to the forward end of the same, the third tubular member being dimensioned to provide a space between the second and third members;

annular closure means secured to the forward ends of the second and third members and spaced from the closure at the forward end of the first tubular member, whereby liquid coolant introduced into the third tubular member flows through the same to the space between the end closure of the first tubular member and from thence through the space between the first and second tubular members;

temperature sensing means comprising a thermal couple and leads connected to the same;

means forming a passage extending through one side of the protective member and also through the refractory material and into the space between the first and second members and through the space between the second and third tubular members to the exterior end of the protecting member; and said heat sensitive thermal couple and leads connected to the same extending within said passage to the exterior end of the protective member with the thermal couple located adjacent said one side of the protective member and in contact with the surrounding gas;

liquid coolant introduced into the third tubular member.

2. A gas temperature monitoring device as in claim 1 in which spacing blocks are disposed between the walls of the first and second tubular members.

* * * * *